3,479,328
NOVEL MONOMERS AND POLYMERS
John David Nordstrom, Bloomington, Minn., assignor to Ashland Oil & Refining Company, Ashland, Ky., a corporation of Kentucky
No Drawing. Filed Nov. 18, 1966, Ser. No. 595,333
Int. Cl. C08f 19/10, 3/64, 15/16
U.S. Cl. 260—86.1                                          7 Claims

ABSTRACT OF THE DISCLOSURE

Homo- or interpolymers of carbamyloxy carboxylates of the formula

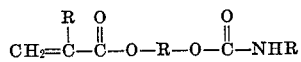

are useful as coatings which are mar-resistant and resistant to acids, bases and many types of solvents.

---

This invention relates to novel carbamyloxy carboxylate monomers, homo- and interpolymers of these novel monomers, and methods for their preparation and use.

The novel carbamyloxy carboxylate monomers of the present invention are illustrated by the following formula:

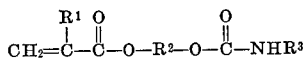

wherein $R^1$ is hydrogen, halogen, or a monovalent hydrocarbon radical of 1 to 8 carbon atoms, and $R^2$ is a divalent hydrocarbon radical of 1 to 12 carbon atoms, and $R^3$ is a lower alkyl radical of 1 to 8 carbon atoms, or, more preferably, hydrogen. Halogen refers to fluorine, chlorine, bromine, and iodine. Since the presence of a fluorine atom inhibits subsequent addition polymerization, chlorine, bromine, and iodine are the more preferred halogens, and chlorine is the most preferred halogen. Monovalent hydrocarbon radical refers to alkyl, aryl, or aralkyl radicals free of ethylenic unsaturation. These radicals may be substituted with non-interfering substituents such as halogen or nitro groups. Examples of such alkyl radicals include, among others, ethyl- n-propyl, isopropyl, n-butyl, isobutyl, chloropropyl, and nitrobutyl. Examples of such aryl radicals include benzyl and phenylethyl. Divalent hydrocarbon radical refers to divalent alkyl radicals such as methylene, ethylene, propylene, isopropylene, butylene, isobutylene, dodecamethylene, among others, as well as divalent aryl radicals such as ortho-, meta-, and para-phenylene and -naphthalene, and divalent aralkyl radicals such as methylphenylene, ethylphenylene, phenylmethylene, and phenylethylene. Lower alkyl radicals refers to methyl, ethyl, propyl, and isopropyl, among others.

Representative specific monomers within the scope of the present invention include:

carbamyloxy methyl acrylate
carbamyloxy methyl methacrylate
carbamyloxy methyl α-chloro acrylate
carbamyloxy methyl α-bromo acrylate
carbamyloxy methyl α-iodo acrylate
carbamyloxy methyl α-fluoro acrylate
N-methyl-carbamyloxy methyl acrylate
N-methyl-carbamyloxy methyl methacrylate
N-methyl-carbamyloxy α-chloro acrylate
N-ethyl-carbamyloxy methyl acrylate
N-ethyl-carbamyloxy methyl methacrylate
N-ethyl-carbamyloxy methyl α-chloro acrylate
2-carbamyloxy ethyl acrylate
2-carbamyloxy ethyl methacrylate
2-carbamyloxy ethyl α-chloro acrylate
2-carbamyloxy ethyl α-bromo acrylate
2-carbamyloxy ethyl α-iodo acrylate
2-carbamyloxy ethyl α-fluoro acrylate
N-methyl-2-carbamyloxy ethyl acrylate
N-methyl-2-carbamyloxy ethyl methacrylate
N-ethyl-2-carbamyloxy ethyl acrylate
N-ethyl-2-carbamyloxy ethyl methacrylate
2-carbamyloxy propyl acrylate
2-carbamyloxy propyl methacrylate
N-methyl-2-carbamyloxy propyl acrylate
N-methyl-2-carbamyloxy propyl methacrylate
N-methyl-2-carbamyloxy propyl α-chloro acrylate
N-ethyl-2-carbamyloxy propyl acrylate
N-ethyl-2-carbamyloxy propyl methacrylate
3-carbamyloxy propyl acrylate
3-carbamyloxy propyl methacrylate
N-methyl-3-carbamyloxy propyl acrylate
N-methyl-3-carbamyloxy propyl methacrylate
N-ethyl-3-carbamyloxy propyl acrylate
N-ethyl-3-carbamyloxy propyl methacrylate
N-ethyl-3-carbamyloxy propyl α-chloro acrylate
4-carbamyloxy butyl acrylate
4-carbamyloxy butyl methacrylate
N-methyl-4-carbamyloxy butyl acrylate
N-methyl-4-carbamyloxy butyl methacrylate
N-ethyl-4-carbamyloxy butyl acrylate
N-ethyl-4-carbamyloxy butyl methacrylate
3-carbamyloxy butyl acrylate
N-methyl-3-carbamyloxy butyl methacrylate
N-ethyl-3-carbamyloxy butyl acrylate
N-ethyl-4-carbamyloxy-3-chloro α-benzyl acrylate
N-methyl carbamyloxy-p-phenylene acrylate
3-carbamyloxy-2-nitropropyl α(m-chlorophenyl) acrylate The novel monomers of the present invention are prepared by processes illustrated by the following equations:

(I)

$$H_2C=\overset{R^1}{\underset{|}{C}}-\overset{O}{\underset{\|}{C}}-OH + R^4C\overset{O}{\diagup\diagdown}CR^5 \longrightarrow H_2C=\overset{R^1}{\underset{|}{C}}-\overset{O}{\underset{\|}{C}}-O-\overset{R^4}{\underset{H}{\overset{|}{C}}}-\overset{R^5}{\underset{H}{\overset{|}{C}}}-OH$$

(α,β-unsaturated acid)   (epoxy)   (hydroxy ester)

$$H_2C=\overset{R^1}{\underset{|}{C}}-\overset{O}{\underset{\|}{C}}-O-\overset{R^4}{\underset{H}{\overset{|}{C}}}-\overset{R^5}{\underset{H}{\overset{|}{C}}}-OH$$

(hydroxy ester)

(II)

$$H_2C=\overset{R^1}{\underset{|}{C}}-\overset{O}{\underset{\|}{C}}-OH + HO{\diagup}(CH_2){\diagdown}_m OH \longrightarrow$$

(α,β-unsaturated acid)   (dihydric alcohol)

$$H_2C=\overset{R^1}{\underset{|}{C}}-\overset{O}{\underset{\|}{C}}-O-(CH_2)_m-OH + H_2O$$

(hydroxy ester)

(III)

$$H_2C=\overset{R^1}{\underset{|}{C}}-\overset{O}{\underset{\|}{C}}-O-\overset{H}{\underset{H}{\overset{|}{C}}}-\overset{H}{\underset{H}{\overset{|}{C}}}-OH + Cl-\overset{O}{\underset{\|}{C}}-Cl \longrightarrow$$

(hydroxy ester)   (phosgene)

$$H_2C=\overset{R^1}{\underset{|}{C}}-\overset{O}{\underset{\|}{C}}-O-\overset{H}{\underset{H}{\overset{|}{C}}}-\overset{H}{\underset{H}{\overset{|}{C}}}-O-\overset{O}{\underset{\|}{C}}-Cl + HCl$$

(chloroformate)

(IV)

$$H_2C=\overset{R^1}{\underset{|}{C}}-\overset{O}{\underset{\|}{C}}-O-\overset{H}{\underset{H}{\overset{|}{C}}}-\overset{H}{\underset{H}{\overset{|}{C}}}-O-\overset{O}{\underset{\|}{C}}-Cl + 2NH_3 \longrightarrow$$

(chloroformate)   (ammonia)

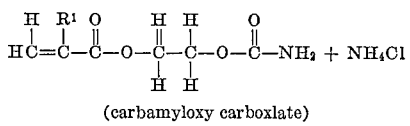

(carbamyloxy carboxlate)

(V)

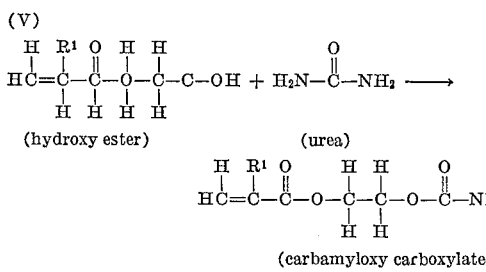

(carbamyloxy carboxylate)

(VI)

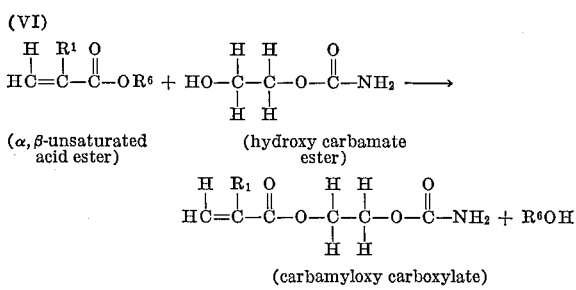

(carbamyloxy carboxylate)

Equations I and II illustrate alternative methods for preparing the hydroxy esters useful in the preparation of the novel monomers of the present invention. Equations III through VI illustrate alternative methods of preparing the novel monomers of the present invention. Equations III and IV together are illustrative of the chloroformate method of preparing the novel monomers of the present invention. Equation V is illustrative of the urea method, and Equation VI is illustrative of the transesterification method of the preparation of the novel monomers of the present invention.

In the method of hydroxy ester formation illustrated by Equation I, an $\alpha,\beta$-unsaturated acid is reacted with an epoxy compound. Examples of suitable $\alpha,\beta$-unsaturated acids include, among others, acrylic acid, methacrylic acid, $\alpha$-ethylacrylic acid, $\alpha$-phenyl acrylic acid, $\alpha$-benzyl acrylic acid, and $\alpha$-chloro acrylic acid. The epoxy compounds which can be used in the reaction of Equation I include the 1,2-epoxy aliphatics such as epoxy ethane (ethylene oxide), 1,2-epoxy propane, 1,2-epoxy butane, etc., and other epoxy compounds such as trimethylene oxide, 1,3-epoxy butane, 2,3-epoxy butane, $\alpha,\alpha'$-epoxy dibenzyl, and tetrahydrofuran. The 1,2-epoxy aliphatics are preferred because of their greater reactivity. In Equation I, $R^4$ and $R^5$ are meant to define radicals commensurate with the above-described definition of $R^2$. Epoxy ethane is the most preferred 1,2-epoxy aliphatic. The reaction of Equation I can be carried out at conditions well-known in the art.

Hydroxy esters which can be made by the above-described reaction include, among others, hydroxyethyl acrylate, hydroxyethyl methacrylate, hydroxypropyl acrylate, and hydroxypropyl methacrylate.

The hydroxy esters produced in accordance with the reaction of Equation I can be used in the reactions represented by Equations III and V discussed below.

The hydroxy esters useful as intermediates in the present invention can also be prepared by the reaction illustrated by Equation II, wherein the $\alpha,\beta$-unsaturated acid is the same as that employed in reaction I. The dihydric alcohols shown are primary alcohols and have both hydroxyl groups connected to carbon atoms having hydrogen as the only other substituent. Dihydric alcohols having secondary or tertiary hydroxyl groups may also be used but are less preferred since secondary and tertiary hydroxyl groups are less reactive. The hydroxy esters which can be produced by the reaction of Equation II are substantially the same as those that can be produced by the reaction of Equation I described above. The reaction of Equation II can be carried out under conditions well-known in the art.

Equations III and IV taken together are illustrative of the two-step chloroformate method, the preferred method, of producing the novel monomers of the present invention from a hydroxy ester. While any hydroxy ester produced by the reaction illustrated by Equations I and II can be used, for illustrative purposes a hydroxy ester having two carbon atoms is shown. This hydroxy ester can be produced by the reaction of Equation I which the epoxy compound is epoxy ethane, or by the reaction of Equation II in which the dihydric alcohol is ethylene glycol. In the first step of the chloroformate method, the hydroxy ester is reacted with phosgene to form a chloroformate as shown in Equation III. In the second step, the chloroformate is reacted with ammonia to yield the novel monomers of the present invention as shown in Equation IV. Ammonium chloride is a by-product which, because of its insolubility, is easily removed by filtration.

In the phosgene reaction illustrated by Equation III, an excess of phosgene is preferably employed in order to prevent carbonate formation. The reaction can be carried out in phosgene alone or in an inert solvent such as ethyl acetate, at temperatures between $-20°$ C. and $+40°$ C. and preferably between $0°$ C. and $+30°$ C. in order to prevent decomposition of the resulting chloroformate.

The hydroxy ester is added slowly to the phosgene which is preferably present in excess to prevent carbonate formation. Twenty to sixty percent excess phosgene has been found suitable. A greater amount of excess phosgene can be used without adversely affecting the reaction, but is undesirable for economic reasons. After completion of the formation of the crude chloroformate, the excess phosgene and solvent, if any, is removed by distillation. The crude chloroformate resulting from the reaction can be reacted further without additional purification, as illustrated by Equation IV.

In Equation IV, which is illustrative of the second step of the chloroformate method of production of the novel monomers of the present invention, an excess of aqueous ammonia is placed in any suitable reaction vessel which is provided with external cooling means in order to remove the heat produced by the exothermic reaction of the chloroformate with ammonia. The chloroformate produced as described above is then slowly added, either alone or in an inert solvent, to the excess ammonia in the reaction vessel while maintaining the temperature between about $-20°$ C. and $+40°$ C. and preferably between about $0°$ C. and $+25°$ C. in order to retard the evaporation of ammonia while permitting the reaction to proceed at an economical rate.

The amount of excess ammonia used is 1.5 to 2.2 and preferably 2.0 to 2.2 moles of ammonia per mole of chloroformate. Greater than 2.2 moles can be used, but the yield of carbamyloxy carboxylate is reduced because of the reaction of ammonia with the unsaturation in the hydroxy ester. Anhydrous ammonia or ammonia dissolved in other suitable solvents can also be used. Aqueous ammonia is preferred because of its ease of handling and because of the use of aqueous ammonia precludes the necessity of pressure vessels attendant with the use of anhydrous ammonia. The abovedescribed chloroformate method of preparation of the carbamyloxy carboxylates of the present invention is simple in operation and results in high yields and represents the preferred method.

In a less preferred embodiment, the chloroformate method may be practiced as a single-step process by mixing the hydroxy ester, the phosgene, and the ammonia; however, the phosgene reacts more readily with the ammonia to form urea and and since urea reacts more sluggishly with the hydroxy ester, an overall reduction in rate of reaction results.

The novel monomers of the present invention can also be prepared by the urea method illustrated by Equation V. The hydroxy ester and urea are mixed in substantially stoichiometric amounts and heated to about 120° C. to 140° C. to yield the carbamyloxy carboxylate. At temperatures below 130° C., the reaction proceeds at an uneconomically slow rate and at temperatures above 130° C., a hydroxy ester polymerization product forms, reducing the yield of the monomeric carbamyloxy carboxylate. For these reasons, the urea method is not preferred.

The novel monomers of the present invention can also be prepared by the transesterification reaction illustrated by Equation VI. In the practice of this method, an ester of an $\alpha,\beta$-unsaturated acid such as those described above is mixed, either alone or in a suitable inert solvent, with substantially stoichiometric amounts of a hydroxy carbamate ester under conditions well-known in the art for transesterification reactions. The hydroxy carbamate esters employed in this reaction can be manufactured by the reaction of carbamic acid on a suitable diol. However, monohydroxy carbamate esters are difficult to obtain because of the tendency of the carbamic acid to react with both rather than only one hydroxyl group of the diol. In Equation VI, $R^6$ represents any compatible hydrocarbon radical such as lower alkyl, examples of which are methyl and ethyl.

Because of the above-described problems attendant with the preparation of these novel monomers by the urea method illustrated by Equation V and the transesterification reaction illustrated by Equation VI, the chloroformate method illustrated by Equations III and IV together represent the preferred method.

The novel monomers of the present invention can be polymerized either alone or in combination with other vinyl monomers, by bulk, solution, suspension, or emulsion methods according to procedures well-known in the art for the polymerization of $\alpha,\beta$-unsaturated acid esters. The carbamate group does not interfere with these procedures. Homopolymers and interpolymers with other suitable vinyl monomers can be produced. Other vinyl monomers heretofore found to be copolymerizable with unsaturated esters are suitable. Examples of these vinyl monomers include, among others, acrylic monomers such as acrylic acid, methacrylic acid, methyl methacrylate, ethyl acrylate, isobutyl acrylate, and acrylonitrile; vinyl esters such as vinyl acetate, vinyl propionate; vinyl aromatic monomers such as styrene, $\alpha$-chloro styrene; vinyl halide monomers such as vinyl chloride, vinylidene chloride; olefinic monomers such as isobutylene, butadiene, neoprene; and vinyl ethers such as methyl vinyl ether.

In general, polymerization of the novel monomers of the present invention can be carried out by heating the monomer alone or with other vinyl monomers to a temperature of 50° C. to 150° C. and preferably 80° C. to 120° C. until polymerization is complete, as determined by analysis for unreacted monomer. Polymerization normally takes place in about 20 to 40 minutes in the presence of 0.01% to 5% and preferably 0.5% to 3% of a suitable free radical polymerization catalyst such as benzoyl peroxide, cumene hydroperoxide, di-tertiary butyl peroxide, methylethyl ketone peroxide, tert-butyl perbenzoate, cyclohexanone peroxide, $\alpha,\alpha'$-azodiisobutyronitrile, and mixtures of the above. A preferred catalyst is a mixture of two parts by weight of cumene hydroperoxide to one part by weight of di-tertiary butyl peroxide. Accelerators such as ethanolamine can also be added in amounts from 0.001% to 2%. Polymerization inhibitors such as hydroquinone in amounts up to 1% can also be employed.

The above reaction can be carried out in the presence of a suitable inert solvent such as xylene, toluene, or benzene, which refluxes within the desired temperature range. Alternatively, a liquid vinyl monomer such as styrene can be employed as the solvent. In order to prevent oxidation of the double bonds, the reaction is preferably carried out in an inert atmosphere. Examples of inert atmospheres include those of helium or nitrogen which is preferred.

The polymers of the present invention can be alkylolated by reacting them with an aldehyde such as formaldehyde which is preferred, acetaldehyde, propanaldehyde, butyraldehyde, furfural, benzaldehyde, acrolein, methacrolein, and glyoxal in aqueous or alcoholic solution. If the reaction is carried out in aqueous solution, the pH is maintained at 8.0 or above; in alcoholic solution both acidic and alkaline conditions can be employed.

When the reaction is carried out in an aqueous medium, the mixture of the polymer and the aldehyde is heated at temperatures between 10° C. and 100° C. and preferably between 35° C. and 80° C. until at least one aldehyde group has reacted with each carbamate group. This is readily determined by the extinction of absorption bands characteristic of primary amines in infrared spectra. For about 0.5 to 4.0 and preferably from 1.0 to 2.5 moles of aldehyde are used per carbamate equivalent. The polymers of the present invention modified by aldehydes as described above may be employed in this form or may be reacted with an alcohol to etherify the alkylol groups. The polymers in the etherified condition are less reactive and, therefore, more stable than the polymers in the alkylol form.

The etherified polymer can be produced by reacting the aldehyde-modified polymer with an alcohol under acidic conditions or by reacting the unmodified polymer with an aldehyde in an acidic alcoholic solution.

When the etherification is carried out with the unmodified polymer in an acidic, aldehyde, alcoholic medium, the reaction mixture is heated at reflux, generally from 10° C. to 170° C. and preferably from 50° C. to 130° C. The reaction of formaldehyde with the carbamate results in methylol groups which react with the alcohol to form ether groups and by-product water which is removed by azeotropic distillation. While any alcohol may be used, the lower aliphatic alcohols of 1 to 7 carbon atoms having one hydroxyl group are preferred. Examples include, among others, methanol, ethanol, propanol, isopropanol, butanol iso-butanol, pentanol, and cyclohexanol.

The alcohol should be present in an excess which provides at least 2 and preferably at least 3 moles of alcohol per mole of aldehyde so that reaction of methylol groups with other carbamate methylol groups is substantially eliminated. From about 0.5 to 4.0 and preferably from 2.5 to 4.0 moles of aldehyde per carbamate equivalent is used. Enough of an acid catalyst is added to lower the initial pH of the solution to between about 2.5 to 6.0. Suitable acid catalysts include inorganic acids such as aqueous sulfuric acid and phosphoric acid, and organic acids such as formic acid, acetic acid, lactic acid, oxalic acid, alkyl and aryl sulfuric acids, the phthalic acids, as well as anhydrides and salts of weak bases of the above acids.

The temperature of the reaction is conveniently controlled by the use of the solvent or solvent mixture which refluxes within the above-described temperature range. Substantially the same conditions and reactants are employed to etherify the aldehyde-modified polymer except that no aldehyde is added to the reaction mixture.

The aldehyde-modified polymers are more reactive and, therefore, less stable than the etherified polymers. However, in subsequent curing by cross-linking, the aldehyde-modified polymers act in a similar manner to the etherified polymers since at the temperatures required for curing the etherified group is reactive. Cross-linking can be effected by simply heating the polymer to any temperature above 100° C. and preferably above 135° C. and below the degradation temperature which is easily determined for any given polymer and, generally, is about 250° C. Alternatively, the polymer can be cross-linked by mixing it with any known cross-linking agent which is suitable for cross-linking prior art alkylol-containing polymers. Examples of such cross-linking agents are methylol phenol and melamine formaldehyde resins. Alternatively, these polymers can be cross-linked by mixing them with 0.05% to 5% and preferably 0.5% to 2.5% of an acid such as p-toluene sulfonic acid.

The novel monomers of the present invention find utility as precursors for the production of other useful chemicals, as cross-linking agents for other resins, as precursors for the production of novel and useful polymers, as well as additives to increase the toughness, mar-resistance, adhesion, chemical- and solvent-resistance of other addition polymers. The novel polymers of the present invention are useful as coating materials for all types of substrates such as wood, glass, ceramic, tile, and the like. Such coatings when cured have excellent adhesion, mar-resistance, as well as resistance to acids, bases, and many types of solvents.

The invention is further illustrated by the following nonlimiting examples which include a preferred embodiment and in which all parts and percentages are by weight unless otherwise indicated.

EXAMPLE 1

This example illustrates the preparation of 2-carbamyloxy ethyl methacrylate by the chloroformate process. Ethyl acetate (100 ml.) is placed in a first flask and pre-cooled to 0° C. Phosgene (150 g.) is placed in the flask. 1-hydroxyethyl methacrylate (130 g.) is added dropwise to the above solution over a 2 hour period while maintaining the temperature below about 5° C. After the addition is complete, the solution is allowed to warm to room temperature (20° C.) and agitated for 12 hours. The ethyl acetate and excess phosgene are removed by reduced pressure distillation at 15 mm. hg, leaving behind a light yellow liquid containing the chloroformate. Hydroquinone (0.1 g.) is added to the light yellow liquid and the resulting solution vacuum distilled. The chloroformate distills at 86° C. to 90° C. at 1 mm. of Hg pressure.

Concentrated ammonium hydroxide (31 g.) having approximately 29.5% $NH_3$ is cooled in a second flask to 5° C. The chloroformate (50 g.) dissolved in ethyl acetate (50 ml.) is then added dropwise to the second flask over a period of 2 hours while maintaining the temperature below 10° C. After addition is completed, the mixture is warmed to room temperature (20° C.) and then filtered to remove the by-product, ammonium chloride. After filtration, the ethyl acetate layer is separated from the water layer. The ethyl acetate portion is vacuum distilled, leaving a colorless oil (45.6 g.). The colorless oil is stirred in a large excess of hexane and the 2-carbamyloxy ethyl methacrylate is thus isolated. This monomer is insoluble and solidifies into a white solid (30 g.). To obtain a purified product, the white solid was recrystallized from hexane. This purified monomer melted at 46° C. to 47° C. A liquid methacrylic ester, which is hexane-soluble, is a by-product of the above reaction.

EXAMPLE 2

This example illustrates the copolymerization of the novel monomers of the present invention with several other vinyl monomers.

A monomer charge of the following composition is prepared:

|  | Weight, g. | Mole, percent |
| --- | --- | --- |
| Methyl methacrylate | 20 | 25 |
| Styrene | 30 | 35 |
| Butyl acrylate | 15 | 14 |
| Butyl methacrylate | 15 | 13 |
| 2-carbamyloxy ethyl methacrylate | 20 | 14 |
|  | 100 | 100 |

One-half of the above charge (50 g.) is placed in a reaction flask containing xylene (50 g.) and butanol (50 g.). The contents of the flask are heated at reflux in a nitrogen atmosphere for 30 minutes. A peroxide solution of cumene hydroperoxide (1 g.) and di-tertiary butyl peroxide (0.5 g.) is then added dropwise to the reaction flask over a period of 2 hours. At the end of this period the contents of the reaction flask are refluxed an additional 3 hours, after which time the polymerization is 99% complete.

The polmer is alkylolated and etherified as follows. To the above polymer solution is added a 40% solution of formaldehyde in butanol (12,7 g.) and oxalic acid (0.18 g.). A Dean-Stark water separator is placed on the reaction vessel and reflux is continued for a period of 2 and 2½ hours, removing water as it is formed. The resultant etherified polmer solution is 51.2% nonvolatile, has a viscosity of 5.5 stokes and a Gardner-Holt color of less than one.

To illustrate the properties of a cured film of the above polymer, 10 g. are placed in a beaker and 1% of p-toluene sulfonic acid (0.05 g.) is added. A 0.003 inch wet film is drawn and cured at 150° C. for 30 minutes.

Certain properties were tested and the results of the test are recorded in the following Table.

EXAMPLE 3

This control example, which is not illustrative of the present invention, is provided for comparision. A monomer charge of the following composition is prepared:

|  | Weight, g. | Mole, percent |
| --- | --- | --- |
| Methyl methacrylate | 45 | 24 |
| Styrene | 68 | 35 |
| Butyl acrylate | 34 | 14 |
| Butyl methacrylate | 34 | 13 |
| Acrylamide | 19 | 14 |
|  | 200 | 100 |

The plymer is prepared according to the procedure of Example 2 except that the period of heating after monomer addition is extended to 5 hours to obtain 99% polymerization.

To the polymer solution is added a solution of 40% formaldehyde in butanol (30.5 g.) and oxalic acid (0.4 g). The reaction is complete in 2 hours, as shown by the collection of water of reaction. The resilient polymer solution is 50.5% nonvolatile, has a viscosity of 15.0 stokes and a Gardner-Holt color of less than one.

The above polymer (10 g.) is mixed with 1% p-toluene sulfonic acid (.05 g.) and a 0.003 inch wet film is drawn and cured at 150° C. for 30 minutes.

Certain properties were tested and the results of the test are recorded in the following Table.

TABLE.—COMPARISON OF CURED FILMS

| Copolymer Solution | Sward Hardness [1] | Mar Resistance | 10 min. | | Appearance |
| --- | --- | --- | --- | --- | --- |
|  |  |  | Xylene Spot [2] | 5% NaOH Spot [2] |  |
| Example 2 | 50 | Good | Good | Very good | Smooth. |
| Example 3 | 48 | do | Poor | Good | "Orange peel" |

[1] A standard film hardness test; the higher the number the harder the film.
[2] These tests were performed by placing a drop of about 0.05 cc. of the indicated chemical on the cured film surface for the time indicated, removing the chemical with a clean, dry cloth, and observing and grading the underlying cured film surface.
Excellent—no discernible effect.
Very good—slight, but discernible effect.
Good—some disintegration of surface, but surface intact.
Poor—film disintegrated; substrate showing through.

EXAMPLE 4

Following substantially the procedure of Example 1, 2-carbamyloxy ethyl acrylate is prepared from 2-hydroxy ethyl acrylate. The 2-carbamyloxy ethyl acrylate copolymerizes readily with equal weights each of methyl methacrylate, butyl acrylate, and styrene.

EXAMPLE 5

Following substantially the procedure of Example 1, 4-carbamyloxy butyl methacrylate is prepared from 4-hydroxy butyl acrylate. The 4-carbamyloxy butyl methacrylate polymerizes readily with equal weights each of methyl methacrylate, butyl acrylate, and styrene.

EXAMPLE 6

Following substantially the procedure of Example 1, 4-carbamyloxy butyl acrylate is prepared from 4-hydroxy butyl acrylate. The 4-carbamyloxy butyl acrylate polymerizes readily with equal weights each of methyl methacrylate, butyl acrylate, and styrene.

Thus, from the foregoing, it is seen that these novel monomers can be employed to produce novel polymers which when cured exhibit excellent hardness, mar-resistance, and chemical resistance. Many modifications of the present invention will be apparent to those skilled in the art without departing from the spirit and scope thereof.

What is claimed is:

1. An addition polymer of a carbamyloxy carboxylate having the formula:

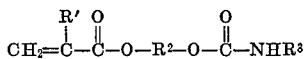

wherein R' is hydrogen, a monovalent hydrocarbon radical of 1 to 8 carbon atoms, or a halogen; $R^2$ is an alkylene, a divalent aryl or a divalent aralkyl radical of 1 to 12 carbon atoms; and $R^3$ is hydrogen or a lower alkyl radical of 1 to 8 carbon atoms.

2. A polymer according to claim 1 wherein R' is hydrogen or a lower alkyl radical, $R^2$ is an alkylene radical, and $R^3$ is hydrogen.

3. A polymer according to claim 1 wherein the addition polymer is formed by interpolymerization with a vinyl monomer.

4. A polymer according to claim 1 wherein the addition polymer is formed by interpolymerization with an acrylic monomer.

5. A polymer according to claim 1 wherein the addition polymer is formed by interpolymerization with a vinyl aromatic monomer.

6. A polymer according to claim 4 wherein the acrylic monomer is a lower alkyl ester of acrylic or methacrylic acid.

7. A polymer according to claim 5 wherein the vinyl monomer is styrene.

References Cited

UNITED STATES PATENTS 3,173,900 3/1965 Hankins.
3,342,791 9/1967 Kelley.

HARRY WONG, JR., Primary Examiner

U.S. Cl. X.R.

260—72, 83.5, 85.5, 86.3, 86.7, 89.5, 486; 117—124, 138.8, 148